(12) United States Patent
Corson et al.

(10) Patent No.: US 11,814,842 B2
(45) Date of Patent: Nov. 14, 2023

(54) BUILDING PANELS AND METHOD OF BUILDING CONSTRUCTION

(71) Applicants: Christian P. Corson, Northport, ME (US); Alex Anmahian, Brookline, MA (US)

(72) Inventors: Christian P. Corson, Northport, ME (US); Alex Anmahian, Brookline, MA (US)

( * ) Notice: Subject to any disclaimer, the term of this patent is extended or adjusted under 35 U.S.C. 154(b) by 0 days.

(21) Appl. No.: 17/865,868

(22) Filed: Jul. 15, 2022

(65) Prior Publication Data
US 2023/0020818 A1 Jan. 19, 2023

Related U.S. Application Data

(60) Provisional application No. 63/222,493, filed on Jul. 16, 2021.

(51) Int. Cl.
*E04C 2/24* (2006.01)
*E04C 2/40* (2006.01)
*C09J 133/00* (2006.01)
*C09J 7/10* (2018.01)
*E04B 1/62* (2006.01)
*E04B 2/74* (2006.01)

(52) U.S. Cl.
CPC .............. *E04C 2/243* (2013.01); *C09J 7/10* (2018.01); *C09J 133/00* (2013.01); *E04B 1/625* (2013.01); *E04B 2/7425* (2013.01); *E04C 2/40* (2013.01); *C09J 2203/346* (2020.08)

(58) Field of Classification Search
CPC .......... E04B 2/7425; E04B 1/625; E04C 2/40; E04C 2/243; C09J 2203/346

USPC .......................................................... 52/585.1
See application file for complete search history.

(56) References Cited

U.S. PATENT DOCUMENTS

| | | | | | |
|---|---|---|---|---|---|
| 2,157,622 | A | * | 5/1939 | Necsen | E04C 2/243 156/87 |
| 3,418,778 | A | * | 12/1968 | Foster | E04C 2/40 52/236.7 |
| 3,496,052 | A | * | 2/1970 | Odenthal | E04C 2/36 52/592.4 |
| 3,974,610 | A | * | 8/1976 | Logie | F16B 5/02 52/285.4 |
| 4,067,165 | A | * | 1/1978 | Timmons | E04B 2/7425 52/282.4 |
| 5,560,151 | A | * | 10/1996 | Roberts | E04B 1/3211 52/249 |
| 5,561,960 | A | * | 10/1996 | Minnick | E04B 1/6183 52/271 |
| 5,826,388 | A | * | 10/1998 | Irving | E04B 1/7612 52/302.1 |
| 6,014,842 | A | * | 1/2000 | Matsubara | E04C 2/384 52/234 |

(Continued)

FOREIGN PATENT DOCUMENTS

CA 2831529 A1 * 4/2014 .............. B28B 1/32

*Primary Examiner* — Babajide A Demuren

(57) ABSTRACT

A set of structurally insulated panels and method of building construction, the set of panels having an indexing system that allows for any one panel to be easily attached to any other panel via indexing pins placed in pre-arranged openings. The indexing system enables essentially any number of panels to be assembled in essentially any reasonable manner to construct a building structure.

13 Claims, 6 Drawing Sheets

(56) References Cited

U.S. PATENT DOCUMENTS

| | | | | |
|---|---|---|---|---|
| 6,494,247 B1* | 12/2002 | Pedone | ................ | E04B 2/7425 |
| | | | | 160/135 |
| 6,609,336 B2* | 8/2003 | Matsubara | ................ | E04C 3/28 |
| | | | | 52/234 |
| 6,758,023 B1* | 7/2004 | Sorkin | ................ | E04B 1/483 |
| | | | | 52/704 |
| 6,802,168 B1* | 10/2004 | Minnick | ................ | E04B 2/7425 |
| | | | | 312/265.5 |
| 8,042,698 B2* | 10/2011 | Kim | ................ | F16M 13/02 |
| | | | | 211/78 |
| 2002/0164447 A1* | 11/2002 | Asgian | ................ | E04B 1/66 |
| | | | | 428/40.1 |
| 2005/0229524 A1* | 10/2005 | Bennett | ................ | B32B 3/06 |
| | | | | 52/592.1 |
| 2006/0174573 A1* | 8/2006 | Melencion | ................ | E04B 1/72 |
| | | | | 52/302.1 |
| 2006/0277854 A1* | 12/2006 | Egan | ................ | E04B 1/70 |
| | | | | 52/302.3 |
| 2007/0113495 A1* | 5/2007 | Roberts | ................ | E06B 3/74 |
| | | | | 52/202 |
| 2007/0204541 A1* | 9/2007 | Sade | ................ | E04B 2/707 |
| | | | | 52/302.1 |
| 2011/0277414 A1* | 11/2011 | Huang | ................ | E04C 2/044 |
| | | | | 52/586.1 |
| 2021/0131096 A1* | 5/2021 | Mordechai | ................ | E04C 2/40 |
| 2022/0013267 A1* | 1/2022 | Kuo | ................ | A63H 33/046 |

* cited by examiner

LVL Framing

CDX

VANA

60mm Gutex

Mento PLUS

Horz Strap

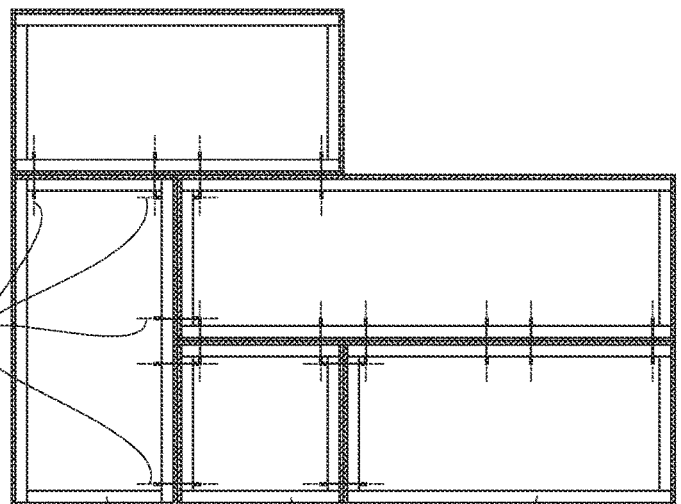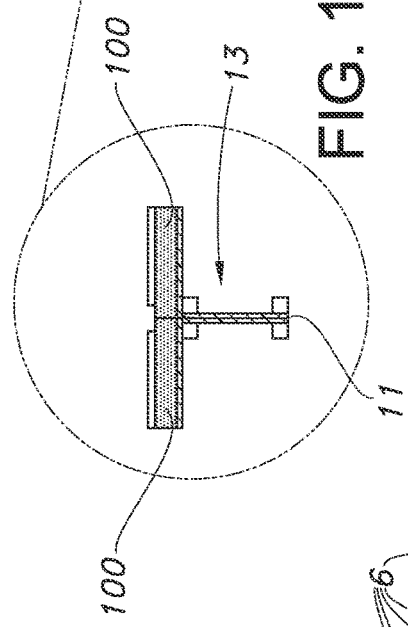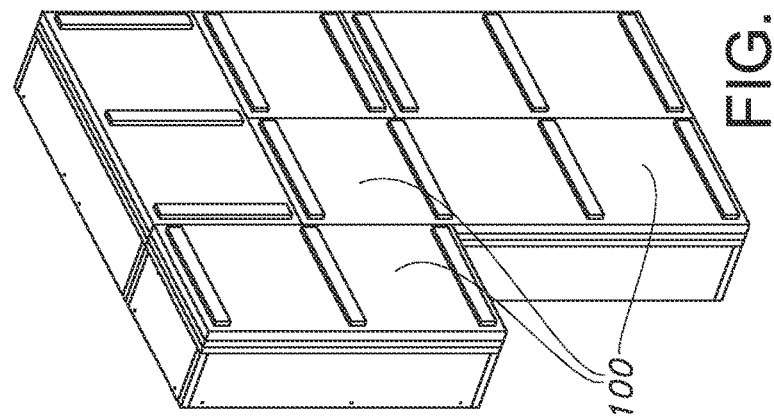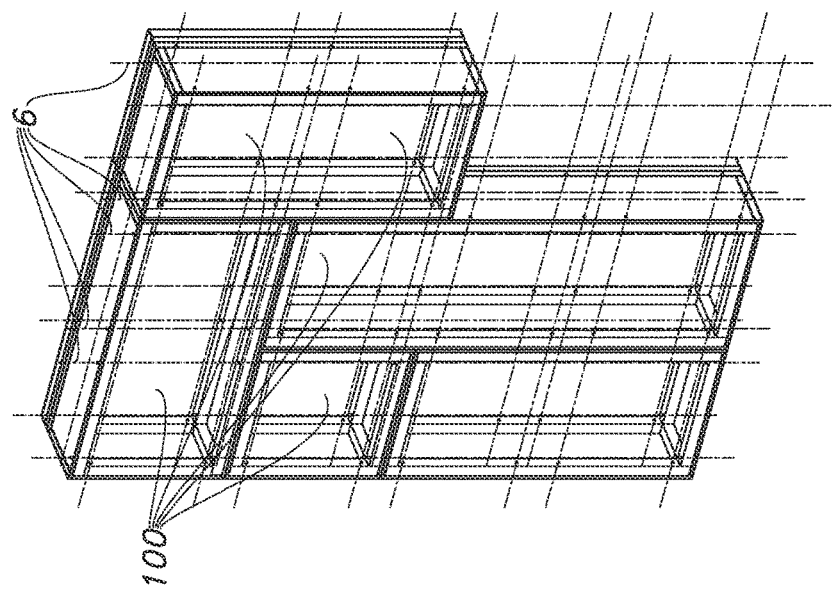

BUILDING PANELS AND METHOD OF BUILDING CONSTRUCTION

BACKGROUND INFORMATION

Field of the Invention

The invention relates to building panels and methods of constructing buildings, and in particular, to pre-assembled building materials that may be used to construct energy efficient habitable building structures.

Discussion of Prior Art

Constructing and/or assembling strong and well-insulated building structures is typically a time-consuming and cumbersome process that requires many plans, materials, and a number individual builders to complete.

Typical building construction requires architectural design and building plans. The necessary materials include a wide range of wood sheathing, beams, insulation, and siding products, as well as multiple fasteners. All wood must be measured and cut for a particular purpose that varies from one building to the next.

Conventional structural insulated panels simplify some of these cumbersome issues in that they combine some of the sheathing and insulation, however, the panels themselves must still be measured, cut, and assembled in a conventionally cumbersome manner.

What is needed, therefore, is a group of prefabricated building panels that may be easily assembled into a variety of building structures.

BRIEF SUMMARY OF THE INVENTION

The invention is a group of prefabricated modular structural insulated panels that incorporate an indexing system that enables relatively easy construction of a building structure. The indexing system enables each panel to be connected adjacent to any other panel in multiple configurations allowing for creation of structural foundations, walls, and roof assemblies that enable a method of creation and assembly of a multitude of building geometries that are constructed using only a minimum of tools.

For example, a group of panels may include 9 different blocks, most of which are either rectangular or square, with one or two blocks including an angled side for use in constructing a roof. The blocks themselves include all of the components necessary to create a wall having the necessary sheer strength and insulation properties.

The indexing system with this example group of 9 different styles of blocks provides the builders with the flexibility to construct a building of any reasonable size and shape, and ease of construction in that only two people are typically needed to construct the desired building.

BRIEF DESCRIPTION OF THE DRAWINGS

The present invention is described with reference to the accompanying drawings. In the drawings, like reference numbers indicate identical or functionally similar elements. The drawings are not drawn to scale.

FIG. 13 is a perspective illustration showing five blocks connected, with dotted lines showing the alignment of the boreholes.

FIG. 14 is a perspective view of four blocks connected together.

FIG. 15 is a bottom plan view illustrating the manner in which index pins are used to connect a number of blocks.

FIG. 16 is a bottom plan view illustrating how the connection of two blocks creates an I-joist.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
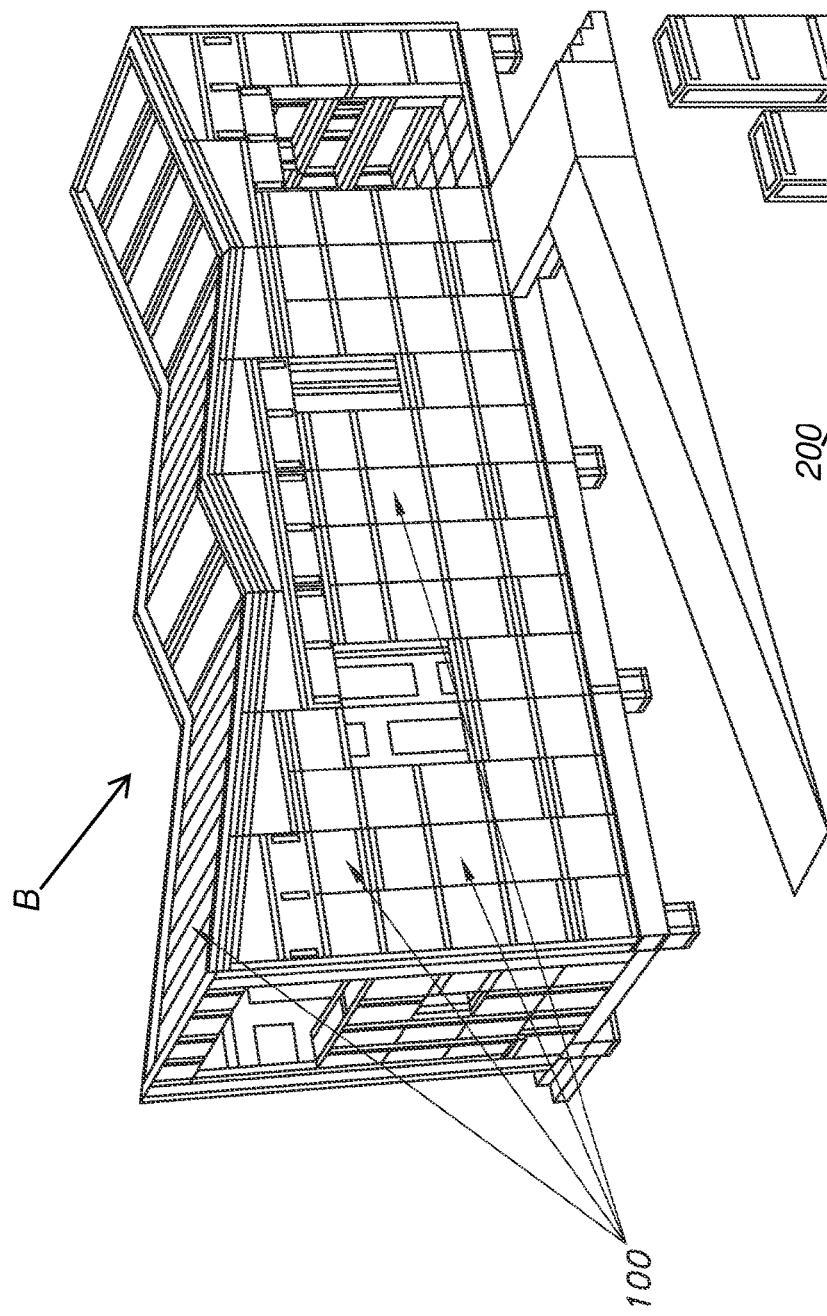
FIG. 1 is a perspective view of a building structure that may be comprised of the panels.
Figure 2:
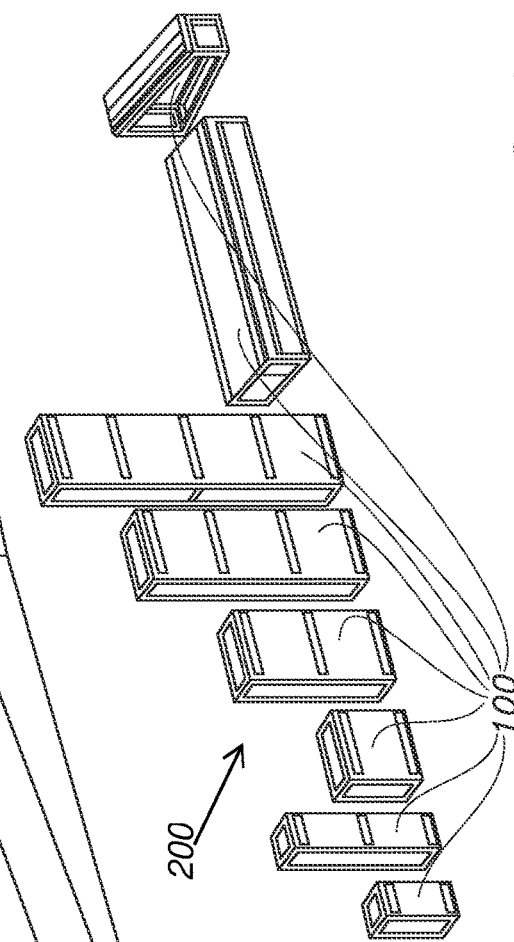
FIG. 2 is a perspective view of a set of building panels according to the invention.
Figure 3:
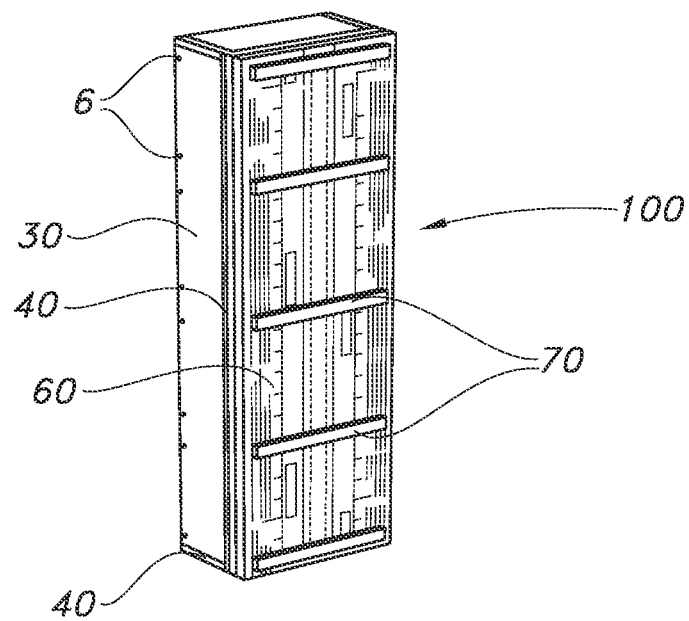
FIG. 3 is a perspective view of an outer side of a building panel.
Figure 4:
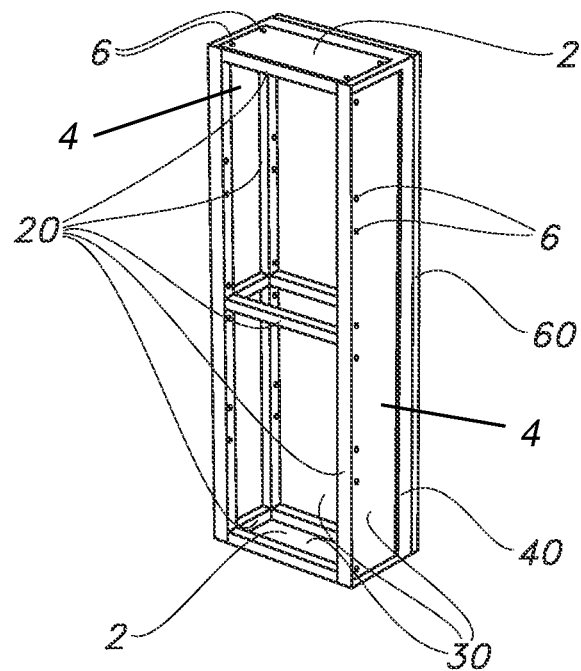
FIG. 4 is a perspective view of an inner side of the building panel.
Figure 5:
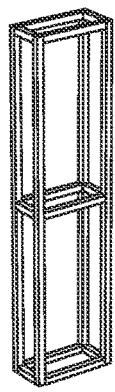
FIG. 5 is a perspective view of the panel framing.
Figure 6:
FIG. 6 is a perspective view of the panel covering.
Figure 7:
FIG. 7 is a perspective view of a sealant tape in the form applied to the panel.
Figure 8:
FIG. 8 is a perspective view of an insulating layer.
Figure 9:
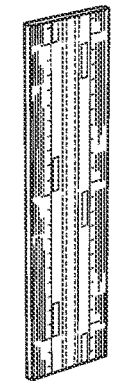
FIG. 9 is a perspective view of a weather resistant layer.
Figure 10:
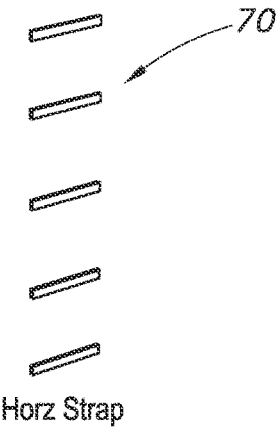
FIG. 10 is an illustration of strapping.
Figure 17:
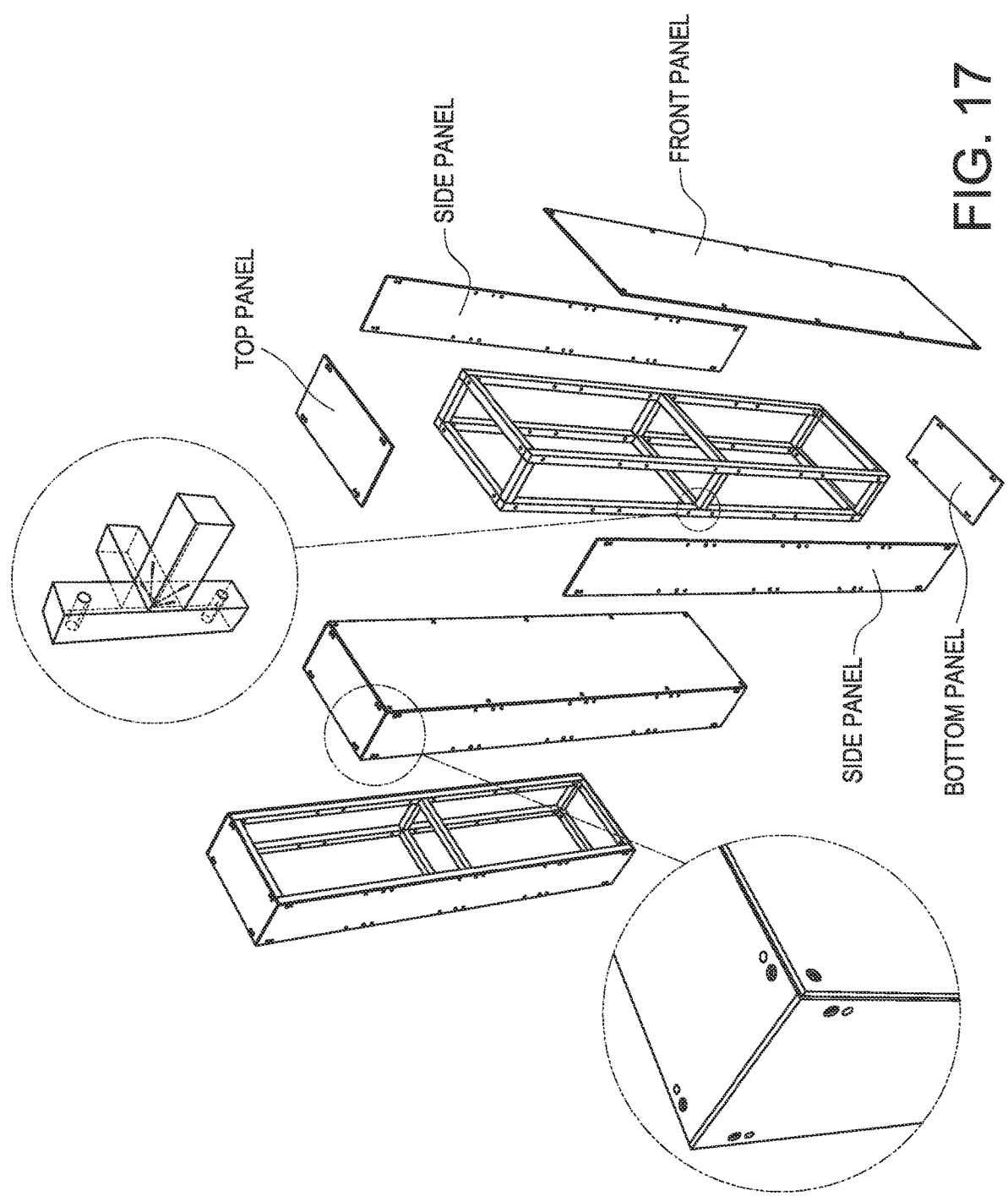
FIG. 17 illustrates how a panel is assembled, showing the individual components, and both an inner and outer view of the assembled panel.

FIGS. 1-17 illustrate a building panel 100 that is adapted for use in a method of building construction. FIG. 1 illustrates an example building B and FIG. 2 illustrates an example set of panels 200. FIGS. 3-4 and 12-13 illustrate a specific example of a panel 100, and FIGS. 5-10 illustrate the individual layers in the example panel 100 with FIG. 17 showing the components in an exploded view as well as a completed assembly. FIGS. 13-16 illustrate ways in which various panels may be assembled.

The building panel 100 is comprised of a number of components that collectively provide the panel sufficient strength and insulation capacity to serve as an individual wall partition that, when assembled into a building, creates an airtight building with excellent insulation values. In other words, each panel 100 is a total wall assembly, not merely structure and insulation.

Each building panel 100 in the set of building panels 200 has an indexing system that includes one or more boreholes 6 and one or more indexing pins 8. The indexing system is configured in a manner that enables any panel to be, for example, rotated 180 degrees, or rotated/positioned in any vertical or horizontal orientation, and connect with any other panel 100 from the set of panels 200 in the construction of the building B. The indexing system and set of panels 200 enable a method of construction that is comparatively easy to assemble, relative to a conventional building structure, with the panels 100 easily secured to one another mechanically by using threaded fasteners and zero volatile organic compound ("VOC") chemical adhesives. After the panels are mechanically and chemically fastened, the layers are sealed to enable the creation of an airtight and weather-tight building structure B.

More specifically, each panel 100 has two end sections 2, a first end section 2 and a second end section 2, and two side sections 4 a first side section 4 and a second side section 4, and are comprised of a number of structural layers. Each panel 100 also includes a number of openings or boreholes 6, likely located on each of the end sections 2 and side sections 4, which are a specific size and a specific distance away from the ends and across the structural layer. For example, the boreholes 6 may have a diameter of ¼ inch with a depth of 2 inches, and be located at least 2 inches from the ends of the respective sections and placed four inches apart along the panel. The indexing pins 8, such as, for example, wooden dowels, may be inserted into the boreholes to connect the panels. In the example of wooden dowels, the connection may be strengthened by driving a mechanical fastener, such as a screw, through the dowel. In the embodiment shown in FIGS. 13-16, for example, the boreholes are indexed to be either 18 inches apart or 6 inches apart and enable any panel to be connected to any other panel in any orientation.

To enable the indexing system the boreholes 6 on one panel 100 are indexed such that they line up with similar boreholes 6 on any other panel 100 in the set of panels 200 at any place where there are boreholes 6. As the boreholes 6 on each panel 100 always line up, regardless of orientation, the panels 100 may be joined together in any configuration. For example, a vertical 2 foot×8 foot panel may join with a horizontal 2 foot×8 foot panel on either the left or the right either vertically, creating a 4 foot×8 foot panel, or at 90 degrees on either the left or the right creating either a left or right 'L' or reverse 'L' or upside down 'L' or reverse 'L' or a sideways 'T' in either of the 2 middle locations, or a 'top T' or 'bottom T' etc.

The structure of the panels 100 in combination with the indexing system also allows for the simple delivery of all components that are necessary to construct a building. In most instances, the builder requires little more than a pallet of panels 100, which are simply assembled by lining up the indexing bores and secured to one another by mechanical and chemical fasteners. For example, FIG. 0.1 shows a building that is comprised of the nine different sized panels shown in FIG. 2.

Each panel 100 is comprised of a number of components. At the center of each panel 100 is a frame 20, for example, a frame constructed of laminated veneer lumber, also referred to as LVL Framing. The frame 20 is covered on at least five and potentially six sides by a covering 30 such as, for example, one or more layers of plywood. There are many suitable coverings 30 and, in particular, types of plywood. One particularly suitable plywood is CDX, and in particular an all-sweetgum plywood. CDX is widely known to those skilled in the art, but in short CDX plywood is comprised of one side that is grade C plywood and the other grade D. This CDX covering 30 on the frame 10 provides a majority of the sheer strength to the panel 100.

A sealant 40 is applied to an outer side of the CDX covering 30 where the different sections of covering 30 come together. For example, if the CDX covering 30 is comprised of five different pieces of CDW than the seams are covered by the sealant 40. There are numerous conventional sealants that may be used, for example, a multi-purpose air sealing tape with waterproof solid acrylic adhesive for interior and exterior use such as TESCON VANA tape. In this instance, the sealant maintains the airtight layer around the perimeter of the joint where the CDX comes in contact with the frame. It also is used in a separate application to maintain a weather resistive barrier once the panels are joined together with the dowels, screws and Contega HF.

Figure 11:
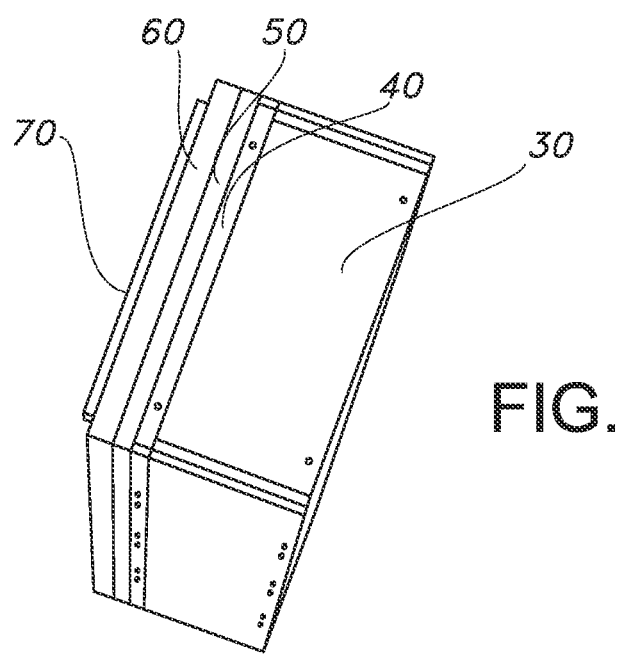
FIG. 11 is a top perspective view showing a panel with a larger insulating layer.
Figure 12:
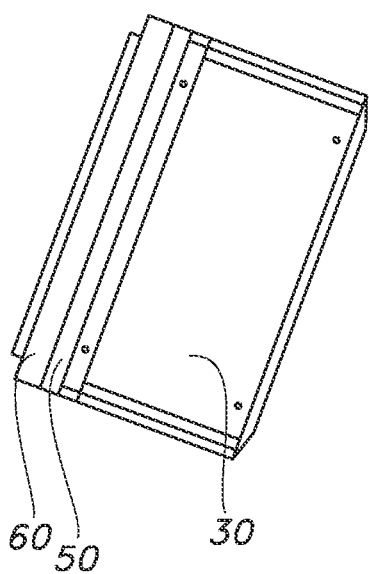
FIG. 12 is a perspective view showing the side and top of the panel with a larger insulating layer.

An insulating layer 50 is applied to the outer side of the CDX covering 30 on top of the sealant 40. There a number of suitable conventionally available insulations that may be used with the insulating layer. For example, GUTEX Thermosafe-homogen universal insulating boards may be mechanically affixed to the CDX covering 30. The specific type and specific amount of insulation may vary based on performance criteria and climate zones. For example, FIGS. 11 and 12 illustrate a panel having a thicker layer of insulation.

The insulating layer 50 is covered with a weather resistant layer 60. There are a number of suitable materials that may be used as the weather resistant layer 60, for example, SOLITEX MENTO PLUS.

Lastly, straps 70 are applied to the weather resistant layer 60 to create a convection and drainage plane that provide drainage and vapor relief to the weather resistant layer. The straps 70 may be oriented in either a horizontal or a vertical configuration. The straps are used to form a rain screen and may be in a number of forms, such as furring strips. Conventional exterior siding may be attached to the straps 70 using conventional techniques.

In this embodiment, the indexing is created by having a series of boreholes 6 that extend through the CDX covering 30 and into the LVL Framing 10. To connect two panels 100 index pins 8, such as wooden dowels, are inserted into the borings 6 that line up with adjacent panels that "catch" the other panel. An adhesive 11, such as CONTEGA HF is applied before panels are connected together and then mechanical fasteners, such as threaded fasteners, are driven through the dowels to create a structural connection that resembles an I-joist 13, as shown in FIG. 16, across the plane where the two panels are connected.

As previously noted, the embodiment shown illustrates a kit that includes 8 different panels, each having the layers described herein. 7 of the 8 panels are rectangular while the other has one end that is elevated relative to an opposite end such that a top side of the panel is slanted. This slanted panel is generally adapted for use in building a roof or ramp.

As an example, the dimensions of the 8 panels 100 illustrated in FIG. 2 are: 1'×2'; 1'×4'; 1'×8'; 2'×2'; 2'×4'; 2'×6'; 2'×8'; Roof 2'×14". The roof wedge, in particular, varies greatly depending on desired roof pitch. The number of bore 6 in each panel varies depending on the size of the panel. For example, a 2'×8' panel has 32 borings whereas a 2'×4' panel may only have 18 borings.

The 8 panels presented in this embodiment are, again, merely an example. Any reasonable number of panels may be provided depending on the specific dimensions and requirements of the intended building structure. In general, each building panel is 8 feet or less in length and 2 feet or less in width.

As previously noted, the method of construction is in one manner quite simple. Namely, the builder simply needs to line up the panels in a desired configuration, connect the neighboring bores with index pins, and then use chemical and/or mechanical fasteners to complete the connection. These steps are then repeated for as many panels as needed to construct a building.

More specifically, for two individuals to use the set of panels 200 shown in FIG. 2 to construct the building B shown in FIG. 1, the following tools may be utilized: an impact driver that is preferably battery operated; several T30 drill bits with removable driver; a hammer; a level; adjustable quick clamps; a caulking gun; a razor knife; a press fix; lumber and fasteners for bracing walls during construction. The following may also be useful: a laser level; a plate level; a lull or other mechanical equipment for lifting; adjustable wall braces; personal protective equipment.

The set of panels 200 is likely to be delivered with the following tools: 4" GRK RSS lags; a Pro Clima Contega HF adhesive; Pro Clima Tescon vana tape; Indexing pins; Pro Clima Press Fixes.

Upon receiving the set of panels the builders are recommended to perform the following steps. First, remove and unpack all of the materials and ensure all required materials are provided. Second, verify the dimensions, namely: a) verify that the existing foundation is level and flat; b) verify that the dimensions of the existing foundation match the instructions provided; c) verify that the foundation is square using the diagonal dimensions on the 'Foundation Plan' provided with the set of panels 200. Minor discrepancies between the actual foundation and the building plans may be acceptable. For example, a tolerance of ¼" to 3/16" is likely acceptable, however, such a discrepancy must be taken into account at the outside corners. Even with a slight discrepancy, the system may still be square if the installation is true and correct, i.e., walls are installed straight, are flat and level, and plumb, and the panels are tightly fastened to one another.

The third step is to organize the materials. A set of panels 200 such as that shown in FIG. 2 are labeled alpha numerically with E1-Ex, W1-Wx, N1-Nx, S1-Sx, with each letter presenting the corresponding Cardinal wall assembly, e.g. "E" means East, "W" means West, etc. It is recommend that the builders separate and stack each wall assembly per the appropriate group in descending numerical order, e.g. 10 on bottom, 9 on top of 10, 8 on top of 9, etc. Finally, each group is stacked on the correct corresponding side of the building.

The fourth step is to prepare the building site. First, the points of the foundation that represent the inside corners of the wall assembly are marked, and then 'pop' chalk lines are added from inside corner to inside corner creating the straight lines that represent the inside edge of the panels 100 during installation. If outside corner 'jigs and 'jogs' exist pop chalk lines are added around the perimeter to represent the inside edge of the wall assembly.

The fifth step is a multi-step process of assembling the building structure. First, a "starter piece" is identified, which is an outside corner, such as any E1, W1,N1, or S1 panel, that is used to start the building so long as the installation plans are adjusted accordingly. Second, using a razor knife cut a ¼" hole in the tip of the Contega HF tube at a 45-degree angle. Third, insert tube of Contega in caulking gun. Fourth, mark out the area to place the first panel with a pencil. Fifth, apply two ¼" beads of Contega HF in a continuous rectangular shape, the first bead approximately 1.5" from the inside of the perimeter of the starter piece, the second bead 1.5" inside the first. Sixth, place the starter piece carefully with the inside corner of the panel on the outside corner of the chalk line being careful to keep the inside edge just inside the chalk like. Seventh, fasten the panel to the foundation with the appropriate hardware, through the preexisting hole at the base of the panel. Next, repeat this for each panel that needs to be fastened to the foundation. Once the foundation is in place, the indexing system is used to construct the remainder of the building.

It is understood that the embodiments described herein are merely illustrative of the present invention. Variations in the construction of the building panel and method of constructing a building may be contemplated by one skilled in the art without limiting the intended scope of the invention herein disclosed and as defined by the following claims.

What is claimed is:

1. A set of building panels adapted for use in constructing a building, the group of building panels comprising:
    a plurality of panels, each of the panels including a first end, a second end, a first side, and a second side;
    the plurality of panels having an indexing system that includes a plurality of openings and indexing pins, the openings located on each of the first end, the second end, the first side, and the second side;
    the openings indexed such that the openings on each of the first end, second end, first side, and second side match the position and location of at least some of the openings on any of the first end, second end, first side, and/or second side of the other panels in the plurality of panels;
    the panels adapted to be attached to one another by inserting the indexing pins into the openings, the openings in the first side and the openings in the second side indexed such that when two panels from the plurality of panels are connected, the two panels form an i-joist;
    the plurality of panels configured to fit together to construct the building.

2. The set of building panels of claim 1, each panel of the plurality of panels including a frame.

3. The set of building panels of claim 2, wherein the frame is made of a laminated veneer lumber.

4. The set of building panels of claim 2, each panel in the plurality of panels including a covering attached to the frame.

5. The set of building panels of claim 4, wherein the covering is a plywood.

6. The set of building panels of claim 4, each panel in the plurality of panels including a sealant that is applied to an outer side of the covering.

7. The set of building panels of claim 6, wherein the sealant is a waterproof solid acrylic adhesive.

8. The set of building panels of claim 6, each of the panels in the plurality of panels including an insulating layer that is applied to the sealant.

9. The set of building panels of claim 8, each of the panels in the plurality of panels including a weather resistant layer that is attached to an outer side of the insulating layer.

10. The set of building panels of claim 9, each of the panels in the plurality of panels including a strap that is applied to the weather resistant layer.

11. The set of building panels of claim 9, wherein the openings extend through each of the straps, the weather resistant layer, the insulating layer, the sealant, the covering, and the frame.

12. The set of building panels of claim 1, wherein the indexing pins are wooden dowels.

13. The set of building panels of claim 12, wherein the indexing pins are secured in the openings with mechanical fasteners.

* * * * *